United States Patent [19]

Itou et al.

[11] Patent Number: 4,908,232

[45] Date of Patent: Mar. 13, 1990

[54] METHOD AND APPARATUS FOR FORMING A THIN FILM ON AN OUTER SURFACE OF A DISPLAY SCREEN OF A CATHODE RAY TUBE

[75] Inventors: Takeo Itou, Fukaya; Hidemi Matsuda, Oomiya; Sakae Kamitani, Tatsuno; Norihisa Takiura, Hyogo, all of Japan

[73] Assignee: Kabushiki Kaisha Toshiba, Kawasaki, Japan

[21] Appl. No.: 179,326

[22] Filed: Apr. 8, 1988

[30] Foreign Application Priority Data

Apr. 10, 1987 [JP] Japan .................................. 62-86966
Feb. 5, 1988 [JP] Japan .................................. 63-23812

[51] Int. Cl.$^4$ .................................................. B05D 5/06
[52] U.S. Cl. ..................................... 427/72; 427/106; 427/108; 427/226; 427/240; 427/314; 427/379; 427/384
[58] Field of Search ................. 427/72, 240, 106, 108, 427/379, 384, 314, 226

[56] References Cited

U.S. PATENT DOCUMENTS

| 3,143,435 | 8/1964 | Martny | 427/72 |
|---|---|---|---|
| 3,376,153 | 4/1968 | Fiore | 427/72 |
| 3,653,939 | 4/1972 | Prazak | 427/72 |
| 3,940,508 | 2/1976 | Wilcox | 427/72 |
| 4,078,095 | 3/1978 | Ratay | 427/72 |
| 4,542,038 | 9/1985 | Odaka et al. | 427/68 |
| 4,746,588 | 5/1988 | Ditty et al. | 427/72 |

FOREIGN PATENT DOCUMENTS

| 0075755 | 7/1978 | Japan | 427/72 |
|---|---|---|---|
| 0147773 | 11/1979 | Japan | 427/72 |
| 0012629 | 1/1980 | Japan | 427/72 |
| 0130039 | 10/1980 | Japan | 427/72 |
| 61104535 | 9/1986 | Japan . | |
| 61290622 | 5/1987 | Japan . | |
| 1213339 | 11/1970 | United Kingdom | 427/72 |

Primary Examiner—Janyce Bell
Attorney, Agent, or Firm—Cushman, Darby & Cushman

[57] ABSTRACT

A method of and apparatus for forming a thin film having a smooth surface and a uniform film thickness such as an antistatic or antireflection film on the outer surface of a display screen of a cathode ray tube, includes the steps of applying a film formation material solution containing a volatile solvent on the outer surface of the display screen of the cathode ray tube to form a solution film, rotating the cathode ray tube about a tube axis thereof to obtain an uniform film thickness of the solution film, and causing a portion of the solution film applied in and near the center of the outer surface of the display screen to dry while the cathode ray tube is being rotated.

17 Claims, 3 Drawing Sheets

METHOD AND APPARATUS FOR FORMING A THIN FILM ON AN OUTER SURFACE OF A DISPLAY SCREEN OF A CATHODE RAY TUBE

BACKGROUND OF THE INVENTION

1. Field of the Invention

The present invention relates to a method of and apparatus for forming a thin film, especially, an antistatic or antireflection film on an outer surface of a display screen of a cathode ray tube.

2. Description of the Related Art

Normally, the outer surface of a display screen of a cathode ray tube has a smooth mirror-like surface, and its surface resistance is high. For this reason, external light is reflected on the outer surface, and therefore an image displayed on an inner surface of the display screen is dull or a static charge is undesirably stored during an operation of the cathode ray tube. In order to prevent such inconveniences, it is well known to form a thin film, especially, an antistatic or antireflection film on the outer surface of a display screen of a cathode ray tube. For this purpose, several manufacturing methods have been proposed.

For example, Japanese Patent Disclosure No. 61-118932 describes a method of coating an alcoholic solution of $Si(OR)_4$ on the outer surface of a display screen of a cathode ray tube by spray coating, drying and baking the coated solution, thereby forming an $SiO_2$ film having antistatic and antidazzling effects.

This method aims at obtaining an antistatic effect of an $SiO_2$ film by forming an $SiO_2$ film having fine projections on the outer surface of a display screen, which diffuse external light, thereby obtaining an antidazzling effect. However, the above method is not suitable for forming a smooth thin film without projections such as a thin film having only an antistatic effect or an antireflection film which utilizes interference of external light, especially when a solution to be coated is volatile. The reason for this is as follows.

FIGS. 1A and 1B schematically show a formation process of an $SiO_2$ film performed by a spray coating method. In FIG. 1A, droplets 2 of an $Si(OR)_4$ alcoholic solution are adhered to an outer surface of a display screen of a cathode ray tube by the spray coating method. When droplets 2 fly in the air in and apparatus for arrow a large amount of alcohol as a solvent is evaporated and lost. Therefore, hydrolysis and condensation of $Si(OR)_4$ progress and the viscosity of the droplets is increased. For this reason, the droplets are adhered on the outer surface of the display screen and become semi-spherical droplets 3. Since semispherical droplets 3 adhered on the outer surface of the display screen continue to be dried, hydrolysis and condensation of $Si(OR)_4$ progress. Therefore, when subsequent droplets are adhered on droplets 3, they do not mix with one another, resultantly forming the projections 4. As a result, $SiO_2$ film 5 having fine projections on its surface as shown in FIG. 1B is formed. This phenomenon occurs whenever a volatile solvent such as an alcohol is used.

In order to form a film having a surface without projections by the spray coating method, droplets must be adhered to the display screen before the solvent in the previously adhered droplets has evaporated. For this purpose, it is conceivable to increase a spray amount of the $Si(OR)_4$ alcoholic solution per unit time. In addition, an airless-spraying machine may be used in place of an air-spraying machine and the distance between the airless-spraying machine and the display screen may be shortened to minimize the evaporation of the solvent while the droplets fly in the air.

By way of these methods, including the spray coating method, a smooth thin film without projections can be formed. However, the process of forming a uniform thin film having a desired thickness on the outer surface of a display screen of a cathode ray tube remains a difficult task, especially in a large cathode ray tube.

A dipping method is also known to those skilled in the art as a method of forming a smooth thin film without projections. In this method, after an outer surface of a display screen of a cathode ray tube is dipped in a film formation material solution, the display screen is raised upright, and then the solution is caused to dry. With this method, a thin film having a smooth surface can be formed. However, since the solution flows downward while it is being dried, a film thickness of a lower portion is increased. In a display screen having a large area, this difference in the film thickness is increased, and therefore a thin film having a uniform thickness is hard to form.

In addition to the above dipping method, a rotating method is also known as a method of forming a smooth thin film on a substrate. In this method, a film formation material solution is applied on the entire surface of a substrate and then the substrate is rotated at a high speed, thereby forming a uniform solution film. This method is effective when a substrate surface is flat and has a relatively small area. However, when a solution containing a volatile solvent is to be applied on a substrate having a convex surface with a relatively large area such as a display screen of a cathode ray tube, it is difficult to directly apply the method.

The reason for this is as follows. That is, in this method, after the solution film is formed by applying the film formation material solution on the outer surface of the display screen of the cathode ray tube to form a solution film, the cathode ray tube is rotated about its tube axis at a high speed (about 130 to 200 rpm) in order to obtain a uniform thickness of the solution film. Then, the excess solution film applied near the center of the display screen is moved to a periphery of the display screen by a centrifugal force and then dried and solidified at the periphery by an air flow generated by rotation, thereby forming annular projections. Since an air flow generated by the rotation of a central portion is weak and hence a solution at this portion is slowly dried, not only the excess portion of the solution but also a solution required for obtaining a desired film thickness are caused to flow to the periphery of the display screen. As a result, the difference in a film thickness is further increased.

The solution moved from the central portion to the periphery of the display screen causes an inferior, nonuniform thickness in the film at the corners of the display screen because a surface of the display screen of the cathode ray tube is convex and square. That is, in FIG. 2, when the cathode ray tube rotates in a direction indicated by arrow a, the solution applied on a portion near the central portion flows in directions indicated by arrows b. Although the solution mostly spreads outwardly, some of the solution stays at an edge portion of the display screen and flows in a direction indicated by arrows c. A solution which flows to the hatched portions then flows in the directions indicated by arrows d to the corners of the display screen because the display screen is convex and square. Since the speed of air flow generated at the corners is high, the solution film is dried faster in the corner areas than in the central portion, and a solution from the central portion further flows onto the dried film in the corner areas and is dried thereon, thereby forming a thick film.

SUMMARY OF THE INVENTION

It is, therefore, an object of the present invention to provide a method of and apparatus for forming a thin film having a smooth surface and a uniform film thickness on the outer surface of a display screen of a cathode ray tube.

According to the present invention, there is provided a method of forming a thin film on an outer surface of a display screen of a cathode ray tube, comprising the steps of: applying a film formation material solution containing a volatile solvent on the outer surface of the display screen of the cathode ray tube to form a solution film; rotating the cathode ray tube about a tube axis thereof to obtain a uniform film thickness of the solution film; and causing a portion of the solution film applied in and around the center of the outer surface of the display screen to dry while the cathode ray tube is being rotated.

A rotational speed of the cathode ray tube is preferably 30 to 300 rpm, and more preferably, 50 to 200 rpm. This rotational speed is preferably changed, e.g., reduced in a stepwise manner.

An angle defined by a rotational axis of the cathode ray tube and a vertical axis is preferably 90° or less.

The drying step can be performed by heating. Heating can be performed by blowing hot air or by using a heater.

When the hot air is used for heating, a temperature of the hot air near the display screen is preferably 30° to 200° C., and more preferably, 50° to 120° C. A flow speed of the hot air near the display screen is preferably 1 to 10 m/s, and more preferably, 1.5 to 6 m/s. The temperature and the flow speed of the air are preferably changed, e.g., increased in a stepwise manner. If drying is rapidly performed from the beginning, the solution film is dried before it attains a uniform thickness, thereby forming scale-like projections on the thin film.

The solution film at a portion near the central portion on the outer surface of the display screen may be dried by preheating this portion up to a temperature higher than that at the corners before the solution is applied.

According to the method of the present invention as described above, a thin film having a smooth surface and a uniform film thickness can be formed on the outer surface of a display screen of a cathode ray tube.

DETAILED DESCRIPTION OF THE PREFERRED EMBODIMENT

A preferred embodiment of the present invention will be described below with reference to the accompanying drawings.

Figure 1A:
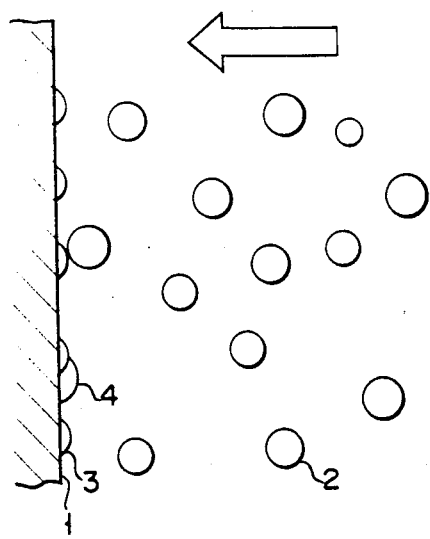
FIGS. 1A and 1B are sectional views schematically showing a process of forming an SiO$_2$ film on a substrate by a spray coating method.
Figure 1B:
Figure 2:
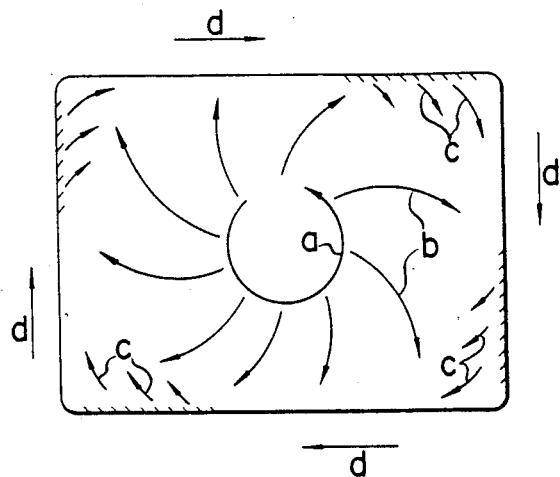
FIG. 2 is a plan view showing a flow of a solution on a display screen obtained when a thin film is formed on a display screen of a cathode ray tube by a rotating method.
Figure 3:
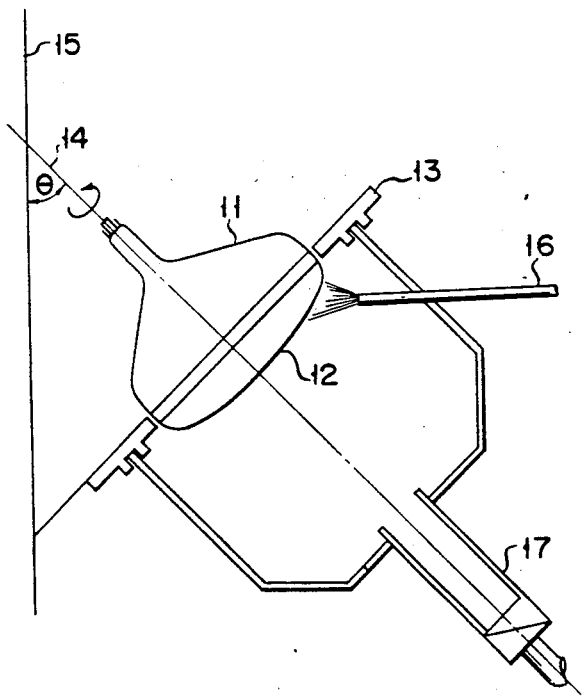
FIG. 3 is a sectional view of an apparatus for carrying out a method of the present invention.

In FIG. 3, the outer surface of display screen 12 of the 25 inch-type color cathode ray tube 11 is washed with fluoric acid, ammonium fluoride, nitric acid, or sodium hydroxide and then washed with pure water. Thereafter, a high pressure air is blown onto the outer surface of the display screen 12 to dry it. Then, tube 11 is mounted on supporting apparatus 13 so that the outer surface of screen 12 faces obliquely downward. Apparatus 13 can be inclined so that angle $\theta$ defined by axis 14 of tube 11 and vertical axis 15 falls within the range of 90° or less. In this example, angle $\theta$ is 15°.

Then, while tube 11 is slowly rotated about axis 14, a mixed solution is applied from nozzle 16 to the entire outer surface of screen 12. A composition of the mixed solution is 7 g of Si(OC2H5), 176 g of isopropyl alcohol, 3 g of hydrochloric acid, and 2 g of water.

Figure 4:
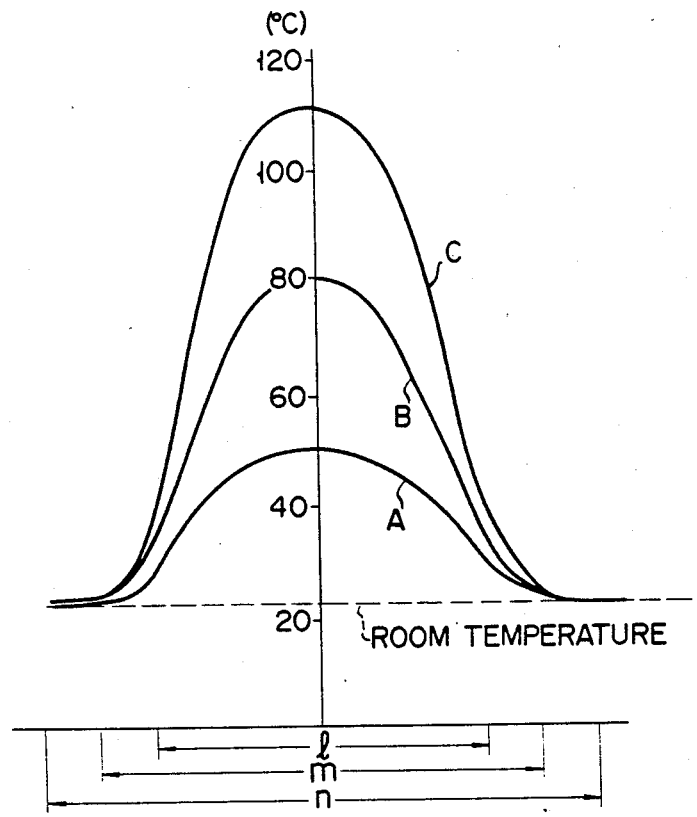
FIG. 4 is a graph showing the temperature distribution which is obtained when hot air located near a display screen surface is blown onto a display screen of a cathode ray tube.

Thereafter, while a rotational speed of tube 11 is increased to 200 rpm to splash the excess solution, hot air is blown from hot air supplying pipe 17 to the central portion of the outer surface of screen 12 for 10 seconds so that the temperature and flow speed of the hot air near screen 12 are about 50° C. and about 2 m/sec, respectively, (a first heating step). Then, the temperature of the hot air near the central portion of screen 12 is increased to about 80° C., and hot air is similarly blown for 10 seconds (a second heating step). Similarly, the temperature of the hot air near the central portion of screen 12 is increased to 110° C. and the hot air is blown for 40 seconds (a third heating step). Curves A, B, and C in FIG. 4 represent temperature distributions of the hot air near the entire outer surface of screen 12 in the first, second, and third heating steps, respectively. Note that distances l, m, and n on the abscissa of FIG. 4 represent the width, the length, and a diagonal of the display screen, respectively.

The results of the surface check, reporting the smoothness and uniformity of the thin film surface formed as described above, are summarized in Table 1 below. Note that Table 1 also displays the results obtained when no hot air is blown, when the hot air is blown only under the heating condition of the first heating step for 60 seconds, and when air at room temperature of 22° C. is blown for 100° C. seconds onto the thin film surface.

TABLE 1

| Air Blowing Condition | Corner Portion Unevenness | Scale-like Unevenness | Film Thickness Uniformity |
|---|---|---|---|
| No | C | A | C Center: Thin Corner: Thick |
| Only in 1st Heating Step (60 sec) | A⁻ | A | A |
| 1st (10 sec) → 2nd (10 sec) → 3rd (40 sec) | A | A | A |
| Room Temperature Air | B | A | A |

TABLE 1-continued

| Air Blowing Condition | Corner Portion Unevenness | Scale-like Unevenness | Film Thickness Uniformity |
|---|---|---|---|
| (100 sec) | | | |

Determination References
A: Excellent
A⁻: Very Good
B: Satisfactory
C: Poor

As is apparent from Table 1, when the air is blown onto the portion near the center of the outer surface of screen 12, a smooth thin film having a uniform thickness can be obtained. Especially better results are obtained when the hot air is blown, and the temperature of the hot air is increased in a stepwise manner.

Then, when a flow speed of the hot air increased in a stepwise manner with a constant temperature is applied to a thin film layer, the same results are obtained as when the temperature of the hot air is increased in a stepwise manner. This is because the temperature of the hot air reaching the outer surface of screen 12 is reduced when its flow speed is low and increased when the flow speed is high.

Note that when the flow speed of the hot air exceeds 10 m/s, the thin film surface is found to possess scale-like unevenness.

The solution film at the central portion of the outer surface of screen 12 can also be dried by preheating this portion, before the solution is applied, to a high temperature of, e.g., 40° C. and preheating the corner portions with a low temperature of, e.g., 25° C.

An angle defined by the rotational axis of the cathode ray tube and the vertical axis is preferably 90° or less. The reason for this is as follows.

Figure 5:
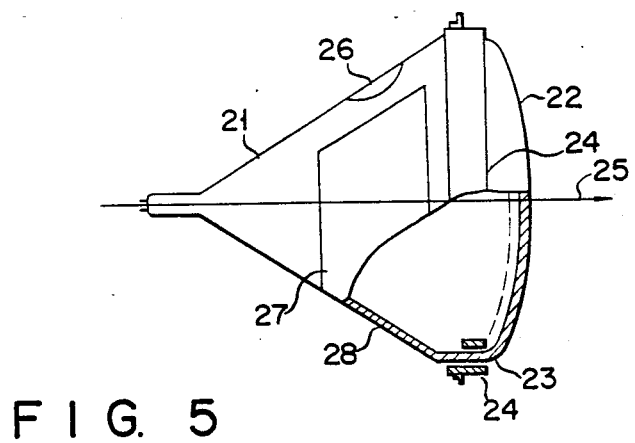
FIG. 5 is a partially cutaway view of a structure of a cathode ray tube.

That is, as shown in FIG. 5, cathode ray tube 21 comprises reinforcing member 24 which serves to prevent cathode ray tube 21 from exploding, located on side periphery 23 of display screen 22. A small gap is formed between side periphery 23 and reinforcing member 24. For this reason, when axis 25 of tube 21 is vertically positioned so that screen 22 faces upward, the solution adhered on the side periphery 23 of screen 22 reaches funnel portion 28 through the gap between periphery 23 and reinforcing member 24 and is adhered on anode 26 or outer conductive film 27, thereby posing a serious problem of, e.g., poor insulation. When the rotational axis of the cathode ray tube is positioned horizontally or facing downward, i.e., when the angle defined by the rotational axis of the cathode ray tube and the vertical axis is 90° or less, the above problem can be solved.

Sometimes dust particles fall upon screen 22 after it has been washed, or get mixed in with the solution. In this case, if the solution is applied to screen 21 and tube 21 is rotated after axis 25 is vertically set so that screen 21 faces up, a film thickness is reduced behind dust particles, i.e., the film is blurred. When the rotational axis of the cathode ray tube is positioned horizontally or facing downward, i.e., when the angle defined by the rotational axis of the cathode ray tube and the axis is 90° or less, dust particles can be easily removed from screen 22 by scattering them outward together with the excess solution by means of a centrifugal force. This solves the above problem.

What is claimed is:

1. A method of forming a thin film including $SiO_2$ on an outer surface of a display screen of a cathode ray tube, comprising the steps of:
    applying a film formation material solution including a volatile solvent and silicon alcoholate on said outer surface of said display screen of said cathode ray tube to form a solution film on said outer surface;
    rotating said cathode ray tube about a tube axis thereof to obtain a uniform film thickness of said solution film on the outer surface of said display screen; and
    causing a portion of said solution film applied in and around the center of said outer surface of said display screen to dry, while said cathode ray tube is being rotated thereby producing $SiO_2$ from said silicon alcoholate in said film formation material solution to form the thin film including $SiO_2$ on said outer surface.

2. A method according to claim 1, wherein a rotational speed of said cathode ray tube is 30 to 300 rpm.

3. A method according to claim 1, wherein a rotational speed of said cathode ray tube is 50 to 200 rpm.

4. A method according to claim 1, wherein a rotational speed of said cathode ray tube is changed in a stepwise manner.

5. A method according to claim 1, wherein a rotational speed of said cathode ray tube is reduced in a stepwise manner.

6. A method according to claim 1, wherein an angle defined by a rotational axis of said cathode ray tube and a vertical axis is not more than 90°.

7. A method according to claim 1, wherein said drying step is performed by heating.

8. A method according to claim 7, wherein the heating is performed by blowing hot air.

9. A method according to claim 7, wherein the heating is performed by using a heater.

10. A method according to claim 8, wherein a temperature of the hot air near the screen is 30° to 200°.

11. A method according to claim 8, wherein a temperature of the hot air near the screen is 50° to 120°.

12. A method according to claim 8, wherein a flow speed of the hot air near the screen is 1 to 10 m/s.

13. A method according to claim 8, wherein a flow speed of the hot air near the screen is 1.5 to 6 m/s.

14. A method according to claim 8, wherein a temperature of the hot air is increased in a stepwise manner.

15. A method according to claim 8, wherein a flow speed of the hot air is increased in a stepwise manner.

16. A method according to claim 7, wherein the heating is performed before the solution is applied by preheating a portion in and around the center of the outer surface to a temperature higher than that at corner portions.

17. A method of forming a thin film on an outer surface of a display screen of a cathode ray tube, comprising the steps of:
    applying a film formation material solution having a volatile solvent and silicon alchoholate on said outer surface of said display screen to form a solution film;
    rotating said cathode ray tube around an axis thereof to obtain a uniform film thickness of said solution film on the outer surface;
    a first heating step of applying a first quantity of hot air to a central portion of said cathode ray tube for a first time, during said rotating, such that hot air of a first temperature reaches said central portion;

a second heating step of applying a second quantity of hot air to said central portion of said cathode ray tube for a second time, during said rotating, such that hot air of a second temperature reaches said central portion, said second temperature being higher than said first temperature; and a third heating step of applying a third quantity of hot air to said central portion of said cathode ray tube for a third time, during said rotating, such that hot air of a third temperature reaches said central portion, said third temperature being higher than said second temperature, thereby producing SiO from said silicon alcoholate in said film formation material solution to form the thin film including $SiO_2$ on said outer surface.

* * * * *